United States Patent
Rawson-Harris

(10) Patent No.: US 6,843,153 B1
(45) Date of Patent: Jan. 18, 2005

(54) SECURITY SCREW

(75) Inventor: Douglas Rawson-Harris, Mona Vale (AU)

(73) Assignee: Good-Cart PTY LTD, Mona Vale (AU)

( * ) Notice: Subject to any disclaimer, the term of this patent is extended or adjusted under 35 U.S.C. 154(b) by 31 days.

(21) Appl. No.: 10/069,146

(22) PCT Filed: Jul. 12, 2000

(86) PCT No.: PCT/AU00/00834

§ 371 (c)(1),
(2), (4) Date: Feb. 22, 2002

(87) PCT Pub. No.: WO01/04501

PCT Pub. Date: Jan. 18, 2001

(30) Foreign Application Priority Data

Jul. 12, 1999 (AU) .............................................. PQ1580

(51) Int. Cl.[7] .............................................. B25B 13/06
(52) U.S. Cl. ........................ 81/120; 81/121.1; 411/402
(58) Field of Search ................................ 81/120, 121.1, 81/125, 436, 460; 411/402, 403, 405, 458

(56) References Cited

U.S. PATENT DOCUMENTS

| 755,804 | A | * | 3/1904 | Smith | ........................ | 411/402 |
|---|---|---|---|---|---|---|
| 3,924,507 | A | * | 12/1975 | Faroni | ........................ | 411/548 |
| 4,018,111 | A | * | 4/1977 | Goldhaber | .................... | 81/436 |
| 4,171,662 | A | | 10/1979 | Simone et al. | | |
| 4,225,165 | A | | 9/1980 | Kesselman | | |
| 4,233,880 | A | * | 11/1980 | Bjorklund et al. | ........ | 411/387.6 |
| 4,258,596 | A | * | 3/1981 | Bisbing et al. | ................ | 81/436 |
| 4,622,850 | A | * | 11/1986 | Gaffrig | ......................... | 73/182 |
| 4,732,517 | A | | 3/1988 | Crouch et al. | | |
| 4,800,787 | A | * | 1/1989 | Cerny | ........................ | 81/121.1 |
| 4,827,811 | A | * | 5/1989 | Vickers | ........................ | 81/436 |
| 5,119,956 | A | * | 6/1992 | Cioletti | ........................ | 220/327 |
| 5,401,133 | A | * | 3/1995 | Kuchler | ........................ | 411/402 |
| 5,598,753 | A | * | 2/1997 | Lee | ............................... | 81/460 |
| 5,647,253 | A | * | 7/1997 | Pozek | ........................... | 81/125 |
| 5,904,383 | A | | 5/1999 | van der Wal | | |

FOREIGN PATENT DOCUMENTS

| AU | 26936/71 | 8/1972 |
|---|---|---|
| AU | 52150/73 | 8/1974 |

* cited by examiner

Primary Examiner—David B. Thomas
(74) Attorney, Agent, or Firm—Connolly Bove Lodge & Hutz LLP; Myron K. Wyche

(57) ABSTRACT

The present invention relates generally to a security screw (1) having threaded shank portion (2) and head portion (3). The head-portion (3) is characterized by having a circular profile with a cylindrical peripheral wall (4) and a smooth crown (5) without any tool engagement slots, recesses or other profile in contrast to a convention screw. The security screw (1) is driven into place by way of a driving tool (9) having shank portion (10) adapted to be rotated by a suitable implement such as a power drive. The driving tool (9) further comprises a cup portion (13) incorporating a cylindrical recess (14) coaxial with the shank (10). The recess (14) is sized and shaped to fit over the head portion (3) of the screw (1).

6 Claims, 2 Drawing Sheets

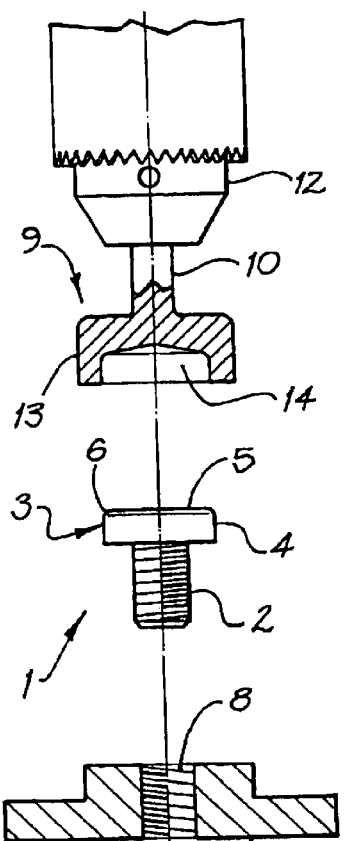
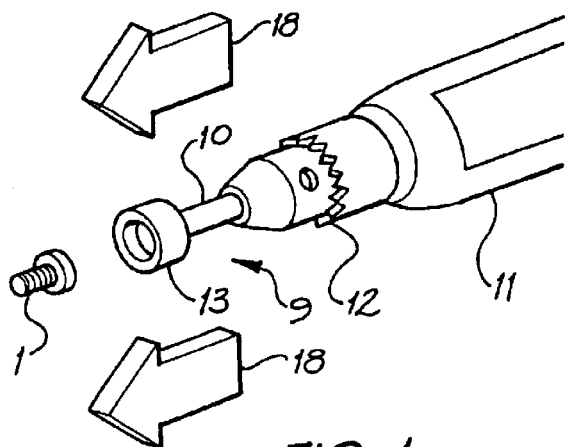
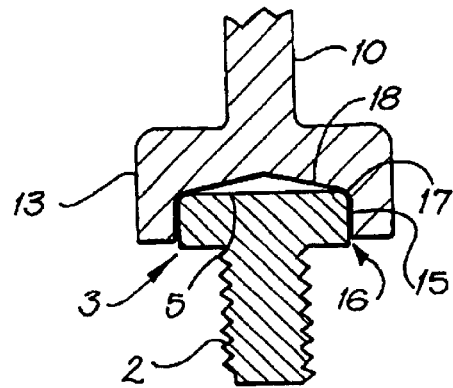
FIG. 1
FIG. 2
FIG. 3

SECURITY SCREW

FIELD OF THE INVENTION

This invention relates to a security screw and has been devised particularly though not solely for the fastening together of components in structures requiring a vandal proof or tamper proof installation.

BACKGROUND OF THE INVENTION

There are many situations where it is necessary to fasten together components of a structure or apparatus which are to be used in an environment which is susceptible to vandalism or unauthorised tampering. The present security screw has been devised particularly for use in fastening components such as street signs, banner arms and other fittings to roadside poles or other similar installations. It is envisaged however that a security screw of this type has a much wider application such as the fastening of window locks or door locks or in any other situation where a screw type fastener must be secured by an authorised user while yet remaining difficult or impossible to release by an unauthorised user.

SUMMARY OF THE INVENTION

In one aspect, the present invention provides a security screw comprising a threaded shank portion and a head portion, the head portion being characterised by having a circular profile about the axis of the shank portion and a smooth exposed surface without any tool engagement slots or discontinuities.

Preferably the exposed surface of the head portion is in the form of a dome-shaped crown. Alternatively the exposed surface is substantially flat with a rounded shoulder to a cylindrical periphery of the head portion.

Alternatively the exposed surface of the head portion includes a recess of a symmetrical configuration which is disposed coaxial with the threaded shank portion. Preferably the recess is at least partly hemispheroidal.

Preferably the security screw is manufactured by the so-called "cold headed" process from a corrosion resistant material such as austenitic stainless steel.

Preferably the screw is manufactured from 316 or 304 stainless steel.

In a further aspect the present invention provides a driving tool for a predetermined security screw of the type comprising a threaded shank portion and a head portion, the head portion of the security screw being characterised by having a circular profile about the axis of the shank portion and a smooth exposed surface without any tool engagement slots or discontinuities, the driving tool comprising a shank portion adapted to be rotated by a suitable implement and a head engaging portion incorporating a friction drive surface which is coaxial with the shank portion, the friction drive surface being configured to fit over the head portion of the screw so as to provide a friction drive between the head engaging portion and the security screw when the driving tool is rotated by the implement.

Preferably the shank portion of the driving tool is adapted to fit into the chuck of a power drill.

Preferably the frictional drive surface in the head engaging portion is at least in part shaped complementary to the exposed surface of the head portion of the security screw.

Preferably the head engaging portion includes a concave recess such as a female dome-shaped recess.

Alternatively the frictional drive surface in the head engaging portion includes a recess having a substantially cylindrical wall immediately adjacent a mouth of the recess, an inwardly turned shoulder portion adapted to bear against a shoulder portion of the head portion of the screw, and a base portion which is deeper in the centre than in the peripheral regions, so that the centre of the recess does not bear against a crown on the head of the screw.

Alternatively the frictional drive surface in the head engaging portion is at least in part dome-shaped and adapted to frictionally engage a corresponding recess in the head portion of the screw.

Preferably at least the head engaging portion of the driving tool and the head portion of the security screw are manufactured from the same material. Typically the entire driving tool and the entire security screw are manufactured from the same material.

Preferably the material is an austenitic stainless steel such as 316 or 304 stainless steel.

One important embodiment of the invention is one in which the driving tool has a head engaging portion with an outer circular shape which is substantially of the same diameter as the head portion of the security screw. This embodiment permits a further inventive development to be used namely the combination of a security washer for use with the security screw, the washer having an upstanding collar portion which surrounds the head portion of the screw thereby preventing access of a tool to the peripheral portion of the head portion of the screw.

Thus, a further inventive aspect is a security screw having a head portion and a threaded shank portion, and a complementary washer which fits on the screw and has an upstanding collar portion which, in use, surrounds the head portion to prevent access to the periphery of the head portion with tools for unscrewing the screw, the screw head portion having a circular profile about the axis of the shank portion and a smooth exposed surface without any tool engagement slots or discontinuities such that torque may be applied to the screw through a driving tool having a screw engagement portion the exterior profile of which is circular and substantially of the same diameter as the head portion of the screw and an interior profile which is at least in part complementary to a portion of the profile of the smooth exposed surface.

Preferably the smooth exposed surface is dome-shaped. Alternatively, the smooth exposed surface has a smoothly rounded shoulder defining an edge surface portion and the shoulder is adapted to be engaged frictionally by a concave complementary portion of the driving tool.

Alternatively the exposed surface of the head portion includes a recess of a symmetrical configuration and disposed coaxial with the threaded shank portions. Preferably the recess is at least partly hemispheroidal.

For good torque transmission characteristics, the material of the screw and driving tool is preferably the same, e.g. stainless steel.

In section the rounded shoulder is preferably part-circular.

For higher security, the washer preferably has an inner edge portion which, in use, extends axially above the top of the exposed surface and the washer is of a hard material, such as hardened steel, to resist cutting of the washer and cutting of the head portion. This increases the resistance to unscrewing with ordinary tools, but the special driving tool can be used to remove the screw.

BRIEF DESCRIPTION OF THE DRAWINGS

Notwithstanding any other forms that may fall within its scope, one preferred form of the invention will now be described by way of example only with reference to the accompanying drawings in which:

FIG. 1 is a diagrammatic perspective view of a security screw and a driving tool according to one embodiment of the invention with the driving tool engaged in the chuck of a power drill;

FIG. 2 is a diagrammatic longitudinal cross section through the aligned axes of the driving tool, security screw, and a corresponding mounting nut;

FIG. 3 is a similar cross section to FIG. 2 showing the head of a security screw engaged with a driving tool according to one embodiment of the invention;

DETAILED DESCRIPTION OF THE PREFERRED EMBODIMENTS

Figure 4:
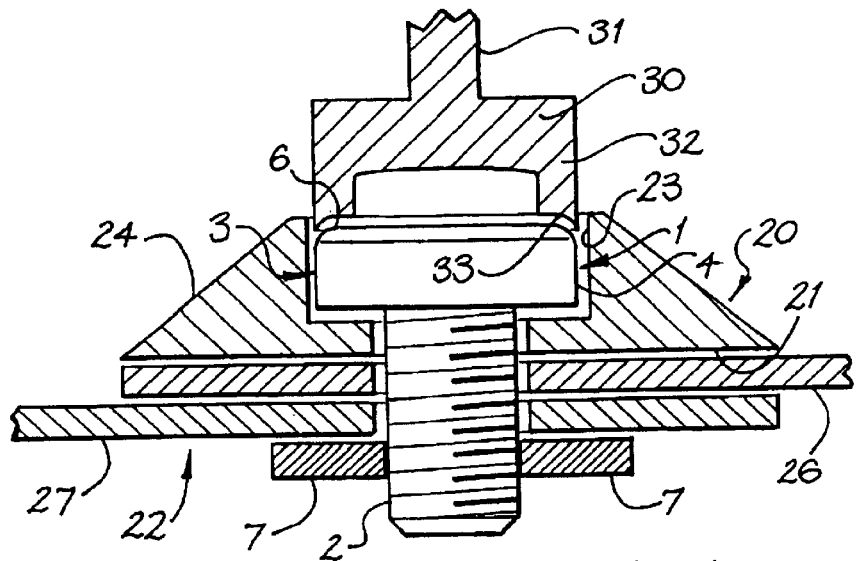
FIG. 4 is a schematic cross-section through another embodiment showing installation on a workpiece.

In the embodiment of FIGS. 1–3, a security screw 1 is provided having a threaded shank portion 2 and a head portion 3. The head portion 3 is characterised by having a circular profile and a smooth exposed surface which in this example includes a cylindrical peripheral wall 4 and a smooth crown 5 without any tool engagement slots, discontinuities or other profile in contrast to a conventional screw. The crown 5 is typically flat, merging into the cylindrical side wall 4 by way of a rounded shoulder 6.

The screw 1 is driven into place e.g. by engaging with a mounting nut 7 having a female thread 8 by way of a driving tool 9 having a shank portion 10 adapted to be rotated by a suitable implement such as a powerdrill 11. To this end, the shank 10 of the driving tool 9 is engageable in the chuck 12 of the power tool in the well known manner. The driving tool 9 further comprises head engaging portion in the form of a cup portion 13 incorporating a cylindrical recess 14 coaxial with the shank 10. The recess 14 is sized and shaped to fit over the head portion 3 of a screw such as 1 as will be explained with reference to FIG. 3.

The recess 14 in the cup portion 13 has a cylindrical side wall 15 immediately adjacent the mouth 16 of the recess transitioning into an inwardly curved shoulder portion 17 adapted to engage and bear against the shoulder portion 6 of the screw 1. The base of the cylindrical recess 14 is deeper at its centre portion 18 than at the shoulder portion 17 so that the centre of the recess 14 does not bear against the flat crown 5 of an engaged screw. To this end the base portion is typically a shallow conical surface in configuration.

In use, when it is desired to fasten a component in place in a secure manner, the component is aligned where desired and the security screw 1 offered up to the mounting nut 7 and rotated to a "finger tight" engagement by the operator. The cup portion 13 of the driving tool 9 is then located over the head 3 of the security screw 1 and force exerted through the power tool 11 as shown by arrows 18 (FIG. 1) forcing the recess 14 in the cup portion 13 of the driving tool 9 into contact with the head 3 of the security screw 1. The driving tool 9 is then rotated by the power drill 11, in turn rotating the head 3 of the screw 1 by frictional engagement between the screw head 3 and the cup 13 of the driving tool 9, until the screw 1 is firmly in place.

It is a particular feature of the security screw 1 that the screw 1 can be removed at any time by authorised personnel having a suitable driving tool, by engaging the tool as previously described and rotating the drill in an anticlockwise direction to undo the screw 1. In this sense the security screw 1 according to this embodiment of the invention is quite different from known prior art types of security screws which have "one way" screwdriver slots or ramps incorporated in the head of the screw.

Although the operation of the security screw will work to some degree with a wide range of materials used for both the screw and the driving tool, it has been found that for an efficient and consistent operation the head of the screw and the cup portion of the driving tool should be made of the same materials. In practice this normally means that the entire security screw and driving tool are formed from the same material. The material is typically a metal and it is believed that the invention will work with a wide range of metals such as brass or black steel, but has been found particularly effective when both the screw and the driving tool are manufactured from austenitic stainless steel.

It is quite common to manufacture stainless steel screws from austenitic stainless steel such as 304 or 316 stainless steel and such screws are both tough in use and corrosion resistant. The screws are commonly made by the so-called "cold heading process".

By manufacturing the security screws according to an embodiment of the invention by a similar process, but without any tool engagement slots or discontinuities, it is relatively simple and inexpensive to provide a corresponding driving tool made from an identical material e.g. from 304 or 316 stainless steel.

By matching the materials in the security screw and the driving tool in this manner, and by providing a frictional engagement between the head of the screw and the head engaging portion of the driving tool, it has been found that an effective friction drive can be provided which enables a screw to be fastened to a desired torque which will make it extremely difficult for unauthorised removal of the screw due to the smooth nature of the crown of the screw which does not provide any surfaces for engagement with a conventional tool such as a screwdriver or alien key and which furthermore is difficult to grip using pliers or the like. A screw so fastened, can however be readily removed by an authorised user having a driving tool made according to an embodiment of the invention.

FIG. 4 shows a particularly advantageous and enhanced aspect of the invention where extra protection against an unauthorised unscrewing of the screw is required. Like parts have been given like reference numerals. In this embodiment a significant extra component is a generally part conical washer 20 through which the screw shank 2 fits, the washer having typically a flat base surface 21 for abutting a workpiece 22, a central cylindrical recess 23 for accommodating the head portion 4 of the screw 1 and a part conical outer surface 24 which terminates in a lip 25 upstanding above the top of the crown of the screw.

Preferably the washer 20 is a relatively hard material such as tool steel suitably plated to resist corrosion and such a hardened steel resists cutting with conventional tools such as hacksaws and the washer thus enshrouds the head of the screw to prevent access with grippers or other ordinary tools.

FIG. 4 shows schematically an installed situation where a workpiece comprises an outer sheet of material 26 and an overlapped inner sheet of material 27 with an aligned aperture for accommodating the shank 2 of the screw 1 and a nut such as a capped nut 7 is provided on the inner surface of the sheet 27.

In this embodiment the driving tool 30 has a shank 31 for mounting in an electric drill conventionally and a head portion 32 which has an outer circular profile substantially the same as the head of the screw so that its leading edge portion can extend below the upstanding lip 25 and into the recess 23. The interior profile of the driving tool includes a concave shoulder 33 which is complementary to the curved shoulder on the edge of the crown of the screw. Typically the sectional shape is part circular and the curve commences substantially at the junction of the shoulder with the outer cylindrical profile.

Figure 5:
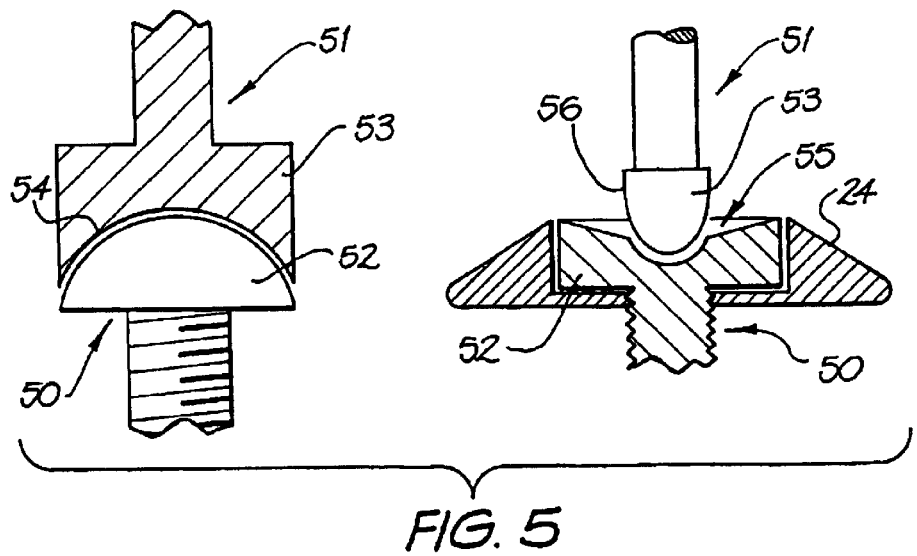
FIG. 5 is a schematic cross-section of further embodiments of a security screw and driving tool.

FIG. 5 illustrates two further variants of a screw 50 and a driving tool 51 according to the invention. In one example the head 52 of the screw 50 is generally dome-shaped and the driving tool 51 includes a head engaging portion 53 which has a recess 54 shaped complementary to the dome-shaped head 52 of the screw 50. The dome-shaped head 52 is shaped so that it cannot be gripped, and in particular about its perimeter, with pliers or the like for unauthorised removal. That is, unlike the preceding embodiments, the head 52 of the screw 50 does not include a cylindrical perimeter wall.

The alternate embodiment shown in FIG. 5 includes a recess 55 formed in the head 52 of the screw 50. The recess 55 is smooth and without slots or discontinuities and, in this example, includes a hemispheroidal recess 56 formed coaxial with the screw 50. The driving tool 51 has a head engaging portion 53 which is at least partly ball-shaped and generally complementary to the hemispheroidal recess 56 of the screw head 52. The alternate screw 50 is designed to be used in conjunction with the security washer 24 which is similar in shape to the previous washer. The security washer 24 together with the alternate screw 50 minimises any likelihood of the head 52 of the screw 50 being gripped by pliers or the like. Like components of the embodiments of FIG. 5 have been designated with the same reference numerals in order to avoid repetition.

It should also be appreciated that the frictional drive surface of the head engaging portion such as 13, 32 or 53 can be varied to increase or decrease the torque applied to the screw such as 2 or 50. Similarly, the material and/or surface roughness of the friction drive surface and corresponding exposed surface of the head of the screw may be varied depending on the torque required to be applied. The driving tool may also be used with a grit finish to promote frictional engagement between the friction drive surface of the driving tool and the corresponding head portion of the screw. The friction drive surface may entirely or only partly engage the head portion of the screw depending on the torque or driving force which is to be imparted to the screw. A temporary adhesive with strong sheer strength may also promote frictional engagement between the driving tool and the head of the screw. The friction drive surface need not be shaped complementary so as to "fit" the head of the screw but rather may be designed to wear with use where after time the mutually engaging surfaces are shaped generally complementary to one another.

Those skilled in the art will appreciate that the invention described herein is susceptible to variations and modifications other than those specifically described. For example, neither the head portion of the screw nor the friction drive surface of the driving tool are limited to the shapes described provided they broadly fall within the scope of the claimed invention.

All such variations and modifications are to be considered within the scope of the present invention the nature of which is to be determined from the foregoing description.

What is claimed is:

1. A driving tool in combination with a predetermined security screw, the predetermined security screw comprising:
   a threaded shank portion; and
   a head portion,
   wherein the head portion has a circular profile about an axis of the threaded shank portion and a substantially dome-shaped smooth exposed surface without any tool engagement slots, and
   the substantially dome-shaped smooth exposed surface is symmetrically disposed about a longitudinal axis of the threaded shank portion; and
   the driving tool comprising:
   a shank portion adapted to be rotated by a suitable implement; and
   a head engaging portion incorporating a friction drive surface that is symmetrically disposed about the longitudinal axis of the shank portion,
   wherein the friction drive surface is configured to fit against the substantially dome-shaped smooth exposed surface of the predetermined security screw so as to provide a friction drive between the head engaging portion and the predetermined security screw when the driving tool is rotated by the suitable implement.

2. The driving tool for a predetermined security screw of claim 1, wherein the driving tool and the predetermined security screw are made from the same material.

3. The driving tool for a predetermined security screw of claim 1, wherein the smooth exposed surface of the predetermined security screw is convex.

4. The driving tool for a predetermined security screw of claim 1, wherein the smooth exposed surface of the predetermined security screw is concave.

5. The driving tool for a predetermined security screw of claim 1, wherein a suitable implement is a power drill.

6. The driving tool for a predetermined security screw of claim 2, wherein the same material is austenitic stainless steel.

* * * * *